(12) United States Patent
Meccarelli et al.

(10) Patent No.: US 10,681,300 B1
(45) Date of Patent: Jun. 9, 2020

(54) SPLIT SCREEN FOR VIDEO SHARING

(71) Applicant: Avaya Inc., Santa Clara, CA (US)

(72) Inventors: Ermanno Meccarelli, Macerata (IT); Laura Baldelli, Monsano (IT)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/276,188

(22) Filed: Feb. 14, 2019

(51) Int. Cl.
*H04N 7/14* (2006.01)
*H04N 5/445* (2011.01)
*H04N 7/15* (2006.01)

(52) U.S. Cl.
CPC ......... *H04N 5/44591* (2013.01); *H04N 7/147* (2013.01); *H04N 7/15* (2013.01)

(58) Field of Classification Search
CPC ........................................................ H04N 7/14
See application file for complete search history.

(56) References Cited

U.S. PATENT DOCUMENTS

| | | | | |
|---|---|---|---|---|
| 5,915,091 A * | 6/1999 | Ludwig | ................. | G06Q 10/10 348/E7.081 |
| 6,243,129 B1 * | 6/2001 | Deierling | ................. | H04N 5/14 348/E5.062 |
| 8,174,556 B1 * | 5/2012 | Barraclough | .......... | H04N 7/142 348/14.01 |
| 8,896,654 B2 * | 11/2014 | Gratton | .................. | H04H 60/80 348/14.04 |
| 9,049,338 B2 * | 6/2015 | Witt | ...................... | H04L 1/0083 |
| 9,124,765 B2 * | 9/2015 | Zhang | ...................... | H04N 7/15 |
| 10,057,305 B2 * | 8/2018 | Woolsey | ................. | H04W 4/14 |
| 2011/0115876 A1 * | 5/2011 | Khot | ....................... | H04N 7/15 348/14.09 |
| 2012/0287231 A1 * | 11/2012 | Ravi | ....................... | H04N 7/148 348/14.12 |
| 2013/0263021 A1 * | 10/2013 | Dunn | .................. | H04L 12/1827 715/756 |
| 2014/0210939 A1 * | 7/2014 | Mock | ..................... | H04N 7/152 348/14.03 |
| 2014/0267578 A1 * | 9/2014 | Rowe | ...................... | H04N 7/15 348/14.11 |
| 2019/0166330 A1 * | 5/2019 | Ma | ........................ | G06F 3/0482 |

* cited by examiner

*Primary Examiner* — Olisa Anwah
(74) *Attorney, Agent, or Firm* — Sheridan Ross P.C.

(57) ABSTRACT

A video stream of image or a first video stream generated by a first application is captured by a second application. The first and the second application run on the same device. The first video stream or a video stream generated from the image of the first application is sent from a first communication device by the second application to a second communication device. A second video stream that is generated by the second application is sent to the second communication device too. The first video stream and the second video stream are transmitted to the second communication device and there displayed.

20 Claims, 9 Drawing Sheets

SPLIT SCREEN FOR VIDEO SHARING

FIELD

The disclosure relates generally to video conferencing and particularly to sharing information in a video conference.

BACKGROUND

Today, there are a variety of services that can be used in video conferencing systems. For example, a user may share a presentation with other conference participants. With the increasing use of mobile devices, mobile devices can be used in place of classical video communication devices with dedicated hardware. In the past, the user could share the content of an external computer in a meeting while connected to the video communication device itself via a physical cable or with other network connections. In addition, a user may be able to share an individual screen of a mobile device during a presentation. While new functionality is being added to mobile devices, existing mobile devices are currently less functional than non-mobile devices when connected to a video conference.

SUMMARY

These and other needs are addressed by the various embodiments and configurations of the present disclosure. A video stream of image or a first video stream generated by a first application is captured by a second application. The first and the second application run on the same device. The first video stream or a video stream generated from the image of the first application is sent from a first communication device by the second application to a second communication device. A second video stream that is generated by the second application is sent to the second communication device too. The first video stream and the second video stream are transmitted to the second communication device and there displayed. In other words, the transmitting device executes the two apps in parallel and displays their content in a split screen where the split-bar defines the two domains of the two apps. The communication application grabs the content of the other the application adjacent laying on the other part of the split-bar and sends it to the second communication device. The split-bar of transmitting device can be moved and grabbed content of the first application is adjusted accordingly to fit the resolution and the form factor negotiated at the connection setup. Eventually the split-bar can be placed to allow the grabbed area to fit the entire screen while the grab and transmit actions continue.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
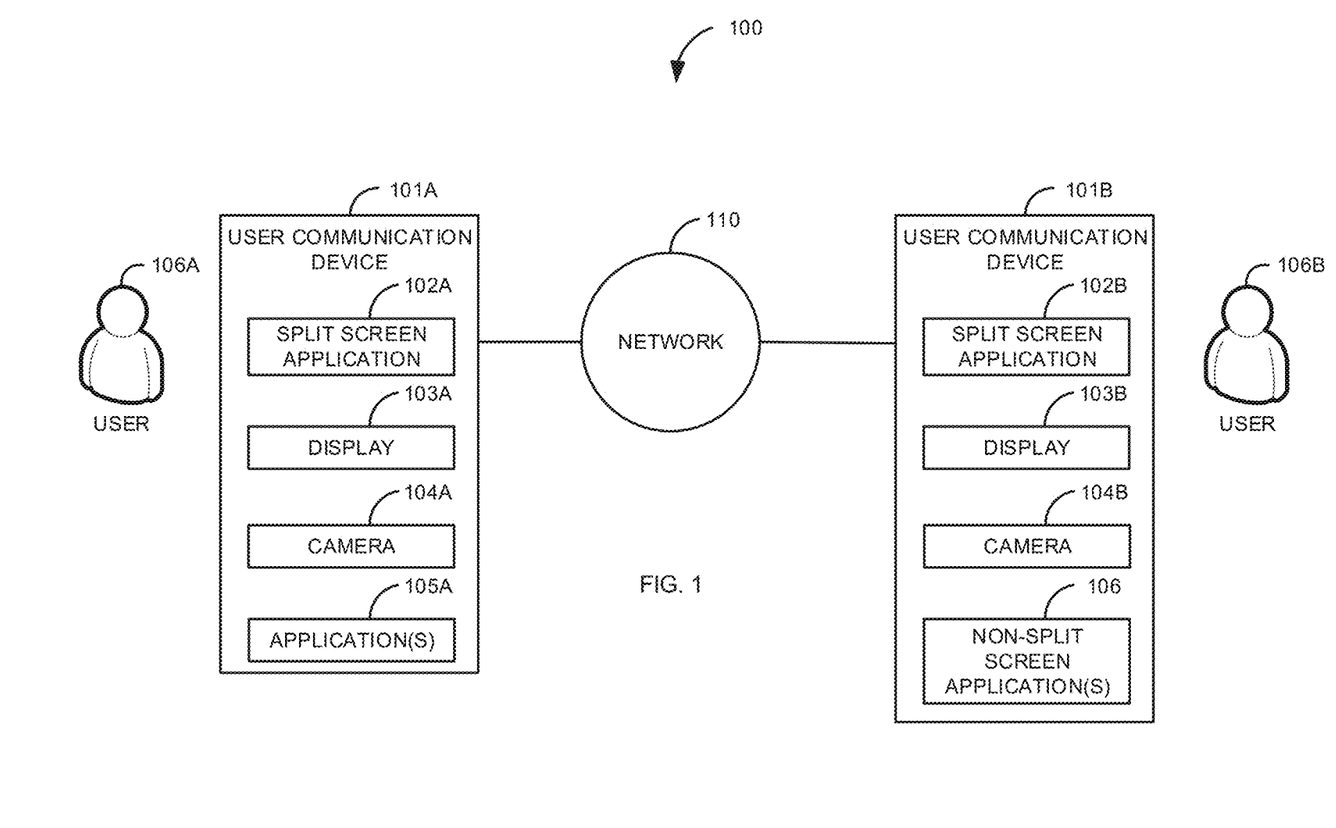
FIG. 1 is a block diagram of a first illustrative system for using a split screen in a peer-to-peer video conference.

FIG. 1 is a block diagram of a first illustrative system 100 for using a split screen in a peer-to-peer video conference. The first illustrative system 100 comprises user communication devices 101A-101B and a network 110. In addition, users 106A-106B are also shown.

The user communication devices 101A-101B can be or may include any user device that can communicate on the network 110, such as a Personal Computer (PC), a video phone, a video conferencing system, a cellular telephone, a Personal Digital Assistant (PDA), a tablet device, a notebook device, a smartphone, and/or the like. The user communication devices 101A-101B are devices where a communication session ends. The user communication devices 101A-101B are not network elements that facilitate and/or relay a communication session in the network, such as a communication manager or router. Although only two user communication devices 101A-101B are shown for convenience in FIG. 1, any number of user communication devices 101 may be connected to the network 110 for establishing a peer-to-peer video conference.

The user communication devices 101A-101B further comprise split screen applications 102A-102B, displays 103A-103B, and cameras 104A-104B. While not shown for convenience, the user communication devices 101A-101B typically comprise other elements, such as a microprocessor, a microphone, a browser, other applications, and/or the like.

In addition, the user communication device 101A also comprises application(s) 105A. The application(s) 105A can be any application, such as, a slide presentation application, a document editor application, a document display application, a graphical editing application, a calculator, an email application, a spreadsheet, a multimedia application, a gaming application, and/or the like. Although not shown, the user communication device 101B may also comprise one or more applications 105. The split screen applications 102A-102B can be or may include any hardware/software that can manage a video conference that is displayed to the users 106A-106B. For example, the split screen applications 102A-102B can be used to establish and display a video conference.

The displays 103A-103B can be or may include any hardware display/projection system that can display an image of a video conference, such as a LED display, a plasma display, a projector, a liquid crystal display, a cathode ray tube, and/or the like. The displays 103A-103B can be used to display split screens in a video conference generated by the split screen applications 102A-102B.

The cameras 104A-104B can be or may include any electronic device that can capture an image of a user 106. The cameras 104A-104B are used to capture video streams/images of the users 106A-106B in a video conference. In addition, video from any other device/application providing a static or time-variant images like video players can be used in place of cameras 104A-104B with the purpose to be video sources for the video conference.

The user communication device 101B may also comprise one or more non-split screen application(s) 106. The non-split screen application(s) 106 may work with the split screen application 102A. For example, in one embodiment, the user communication device 101B may not have the split screen application 102B. In this case, the video streams sent by the split screen application 102A are displayed at a receiving side by one or more non-split screen applications 106 via their available representation layouts.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocol, video protocols, Integrated Services Digital Network (ISDN), and the like. Thus, the network 110 is an electronic communication network configured to carry messages via packets and/or circuit switched communications.

Figure 2:
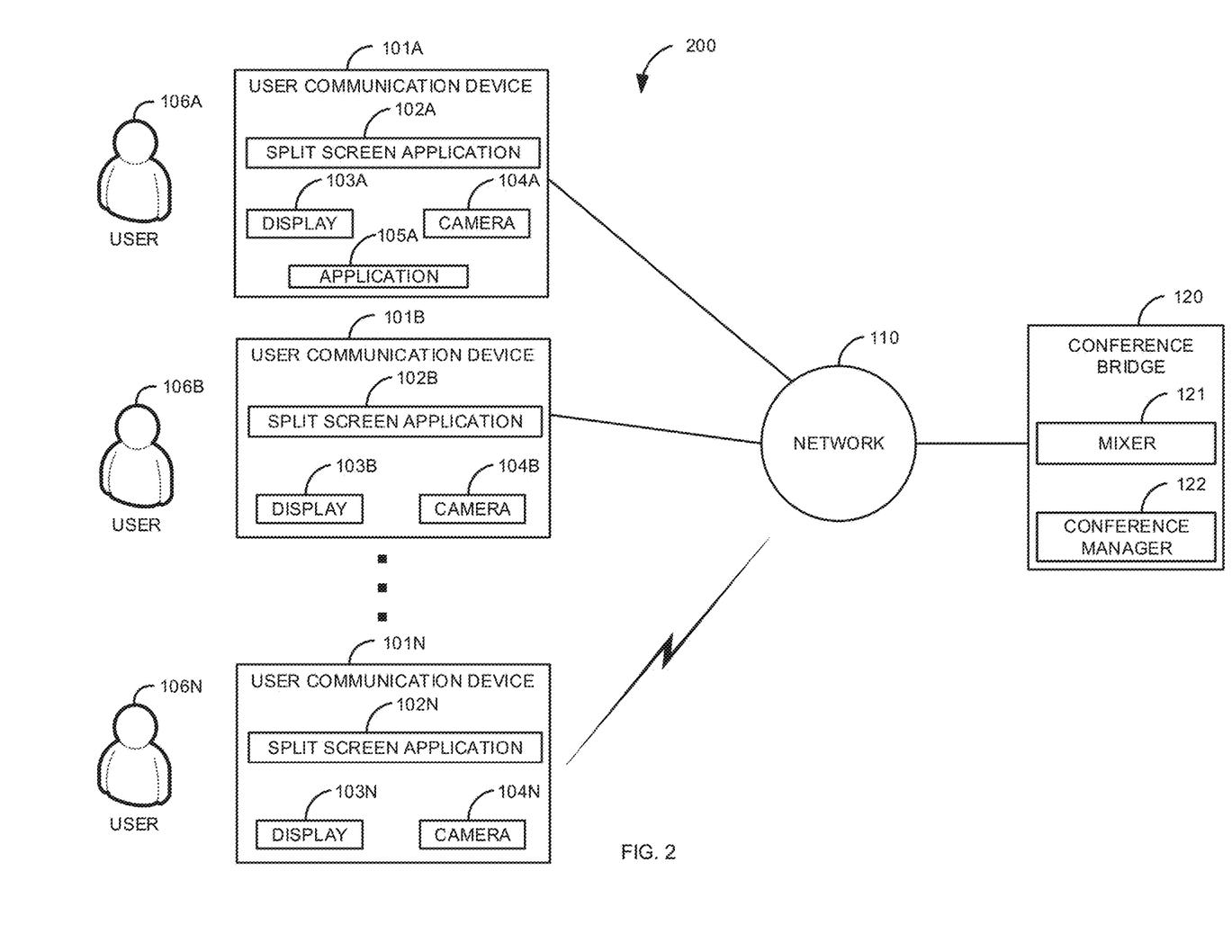
FIG. 2 is a block diagram of a second illustrative system for using a split screen in bridged video conference.

FIG. 2 is a block diagram of a second illustrative system 200 for using a split screen in bridged video conference. The second illustrative system 200 comprises user communication devices 101A-101N, the network 110, and a conference bridge 120. The user communication devices 101A-101N are similar devices to the user communication devices 101A-101B of FIG. 1. In FIG. 2, any number of user communication devices 101A-101N can be connected to the network 110.

The conference bridge 120 can be or may include any hardware coupled with software that can bridge a video conference, such as, a Multipoint Conferencing Unit (MCU). The conference bridge 120 may comprise multiple conference bridges 120. The conference bridge 120 comprises a mixer 121 and a conference manager 122.

The mixer 121 can be or may include any hardware coupled with software that can mix/route one or more audio/video signals. The conference manager 122 can be any hardware coupled with software that can manage/control a video conference between the user communication devices 101A-101N.

Although not shown for convenience, the user communication devices 101B-101N may also comprise one or more non-split screen application(s) 106. In this embodiment, the one or more non-split screen application(s) 106 in the user communication devices 101B-101N may work with the split screen application 102A via the conference bridge 120.

Figure 3A:
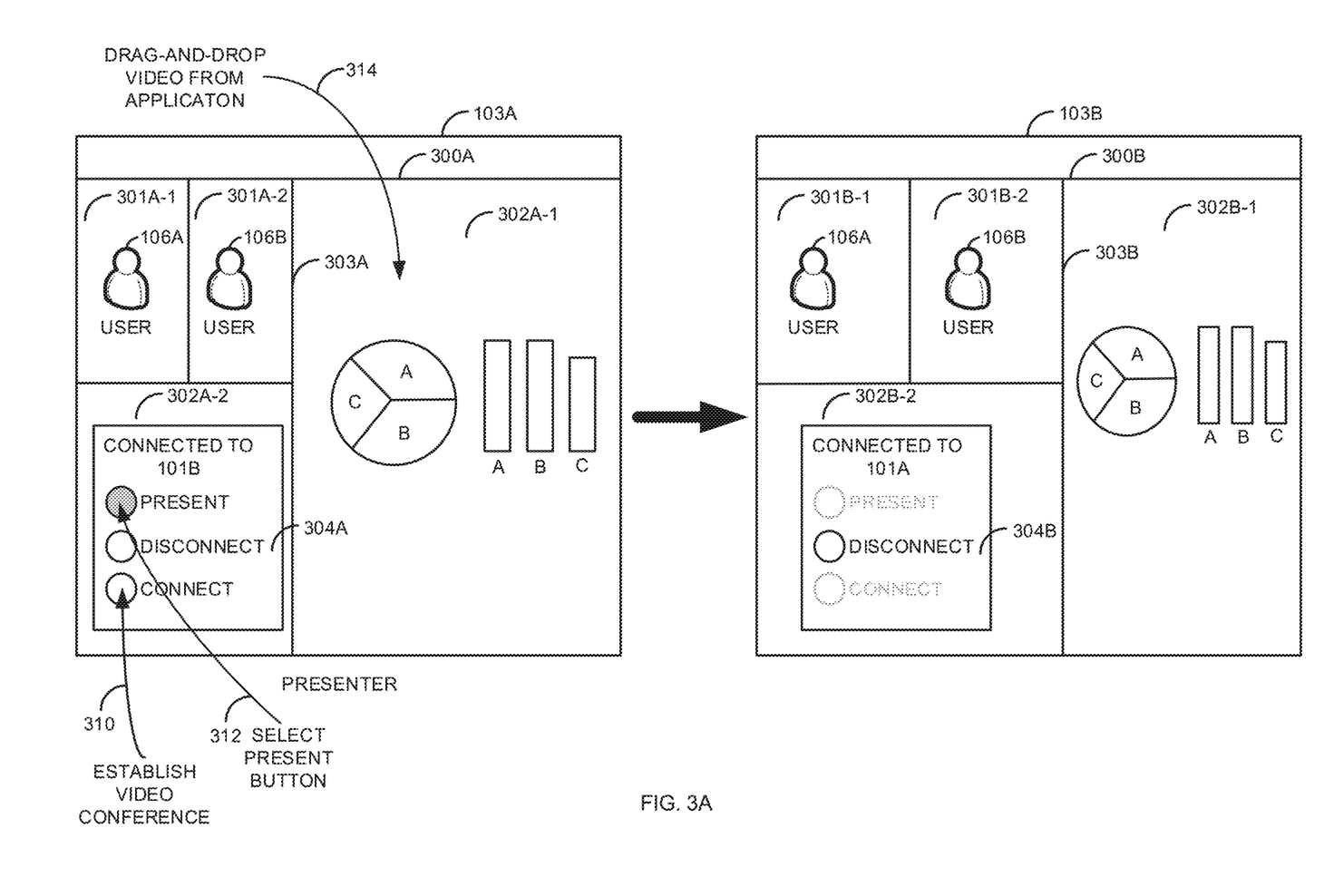
FIG. 3A is a diagram of how a split screen is propagated in a video conference where each user can independently control portions of a split screen.
Figure 3B:
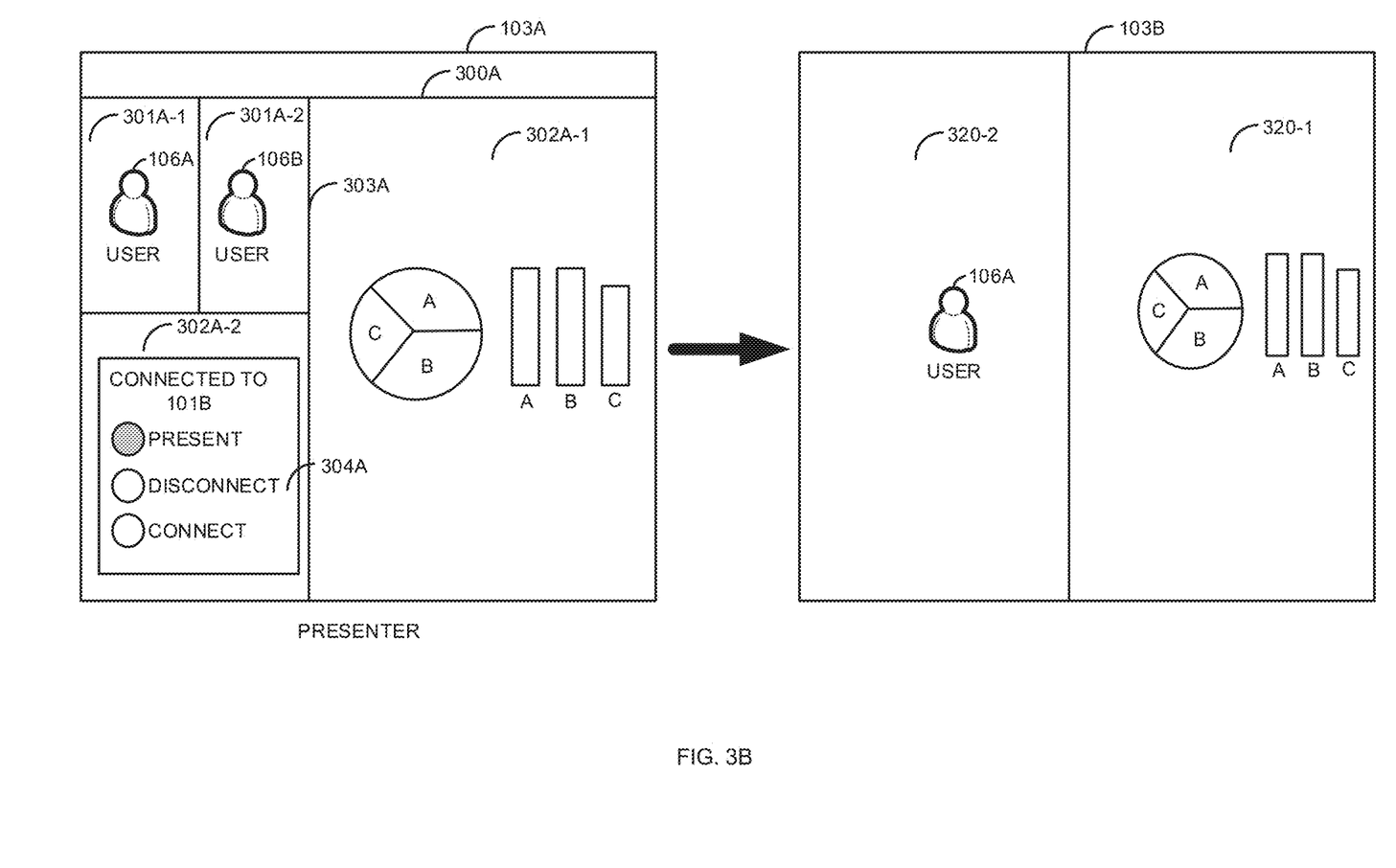
FIG. 3B is a diagram of how video of a split screen works with a non-split screen application.

FIG. 3 is a diagram of how a split screen 300 is propagated in a video conference where each user 106 can independently control portions 302 of a split screen 300. Illustratively, the user communication devices 101A-101N, the split screen applications 102A-102N, the displays 103A-103N, the cameras 104A-104N, the application(s) 105A, the conference bridge 120, the mixer 121, and the conference manager 122 are stored-program-controlled entities, such as a computer or microprocessor, which performs the method of FIGS. 3-8 and the processes described herein by executing program instructions stored in a computer readable storage medium, such as a memory (i.e., a computer memory, a hard disk, and/or the like). Although the methods described in FIGS. 3-8 are shown in a specific order, one of skill in the art would recognize that the steps in FIGS. 3-8 may be implemented in different orders and/or be implemented in a multi-threaded environment. Moreover, various steps may be omitted or added based on implementation.

FIG. 3A shows an exemplary video conference between the user communication devices 101A-101B. FIG. 3A may work for a peer-to-peer video conference as described in FIG. 1 or in a bridged video conference as described in FIG. 2. FIG. 3A may work as described in FIG. 1 in a peer-to-peer video conference where there are more than two user communication devices 101 in a video conference.

The user 106A at the user communication device 101A executes the split screen application 102A to display the split screen 300A in the display 103A. The split screen 300A comprises portions 302A-1 and 302A-2. The portions 302A-1 and 302A-2 are divided by a split bar 303A. The split bar 303A can be selected by the user 106A (e.g., via a touchscreen or mouse) and can be moved horizontally to change the size (proportion) of the portions 302A-1 and 302A-2. In other words, the split bar 303A is a horizontal split bar 303A. In one embodiment, the split bar 303A (also 303B) can be controlled by another means, such as, but not limited to, a menu, a button, a voice command, and/or the like.

The portion 302A-2 includes a management menu 304A. Using the management menu 304A, the user 106A can establish a video conference by selecting a connect button as shown in step 310. In this example, user 106A establishes a video conference with the user communication device 101B/ user 106B (e.g., using a window that is displayed when the connect button is selected). As a result of establishing the video conference, the user 106A's video stream is displayed in window 301A-1 and the user 106B's video stream is displayed in the window 301A-2 (which are part of the portion 302A-2).

The user 106A selects the present button, in step 312, to present in the video conference. By selecting the present button in step 312, a capture function of the split screen application 102A is activated. The capture function can grab/capture an image/video stream that is transmitted by, displayed in, and/or stored in memory by the application 105A (e.g., based on a drag-and-drop from the application 105A as shown in step 314). For example, as shown in FIG. 3A, the device 103A is executing the split screen application 102A. The split screen application 102A and the displays the portion 302A-2 of the screen and a slideshow application 105A in portion 302A-1 of the screen, respectively the left and right sides of the split-bar 300A; the split screen application 102A implementing a split-and-share functionality grabs the area of the slideshow application 105A in portion 302A-1 and encodes the image into a corresponding video stream and transmits this video stream to the communication device 103B. In addition, instead of an image, a video stream may be grabbed/captured from the portion 302A-1 and then shared. Any content represented in the portion 302A-1, when grabbed/captured is then transmitted as a video stream to the user communication device 101B and displayed as shown in portion 302B-1. For example, a YouTube® video represented into the portion 302A-1 can be grabbed and shared. A menu and/or button may be used to select the application 105A which is the source of the video image/stream. For example, the split screen application 102A may display a button/menu for any active application(s) 105A that has an image/video stream for selection by the user 106A.

The user 106A can select the split bar 303A and move it in either direction horizontally to change the proportions of the portions 302A-1 and 302A-2. For example, the user 106A may move the split bar 303A to the left to increase the size of the portion 302A-1.

When the video conference is established with the user communication device 101B, the split screen application 102B displays the split screen 300B in the display 103B. The split screen 300B has portions 302B-1 and 302B-2, and a split bar 303B. The portion 302B-2 has window 301B-1 that displays the video stream of the user 106A (which is sent in a first video stream (e.g., a Real-Time Communication Protocol RTCP stream from the user communication device 101A)) and the window 301B-2 that displays the video stream of the user 106B. In addition, the portion 302B-2 has a management menu 304B. In the management menu 304B, the present button is greyed out (is not selectable) because the user 106A is presenting. The connect button in the management menu 304B is also greyed out because the user 106B is already connected to the video conference.

Once the user 106A captures/grabs (e.g., drags-and-drops in this example) the image/video stream from the application 105A into the portion 302A-1, the portion 302B-1 then displays the image/video stream from the application 105A (which is sent in a second video stream). However, as shown in FIG. 3A, the portion 302B-1 is smaller than the portion 302A-1. This is because each of the users 106A/106B can separately control the proportions in the split screens 300A/ 300B using the split bars 303A/303B. The user 102B may move the split bar 303B so that only the portion 302B-1 is being shown.

In FIG. 3A, the split bars 303A/303B are shown as horizontal split bars 303A/303B. However, in other embodiments, the split bars 303A/303B may be vertical split bars 303A/303B. In addition, the orientation of the split bar 303 may be user 106 controlled. For example, the user 106A (on a video conference split-screen device) may select a horizontal split bar 303A and the user 106B (on a smartphone) may select a vertical split bar 303B based on the type of display 103B in the smartphone. In another embodiment, the split bars 303A/303B may be based on a corner. For example, the portions 302A-2/302B-2 may only be in a corner of the split screens 300A/300B. The users 106A/ 106B may be able to re-proportion the split screens by selecting an edge/corner of the portions 302A-2/302B-2 to change the size of the portions 302A-2/302B-2.

In FIG. 3A, if there are two or more user communication device 101 in the video conference hosting multiple calls, the user communication device 101A sends the image/video stream of the application 105A (in a presentation channel) and the video stream of the user 106A (shown in 301B-1) to each user communication device 101 in the (endpoint-hosted) video conference.

If the conference bridge 120 is used where there are two or more user communication devices 101A-101N in the video conference, the mixer 121 sends the image/video stream of the application 105A (in the presentation channel) and the video stream of the user 106A (shown in 301A-1) to each user communication device 101 in the video conference.

FIG. 3B is a diagram of how video of a split screen 102A works with an existing non-split screen application 106. In FIG. 3B, the split screen 300A in the display 103A is the same as in FIG. 3A. However, instead of using the split screen application 102B for displaying both the portions 302B-1 and 302B-2, windows 320-1 and 320-2 are displayed by one or more non-split screen application(s) 106. For example, the non-split screen application(s) 106 may be known H.323 or Session Initiation Protocol (SIP) applications that can display one or more existing video streams. For example, the window 320-2 may be displayed by an existing conferencing application and the display 320-1 may be displayed by a separate non-split screen application 106. In this embodiment, the split screen application 102A on a first device 101A works with one or more existing non-split screen application(s) 106 by receiving the video stream of the user 106A and the video stream of the presentation and presenting them in separate windows 320-1 and 320-2 that does not use the split screen functionality.

This is because the non-split screen application 106 running on the user communication device 102B, represents contents of received video streams and possibly local camera in layouts. Content of presentation video stream from user communication device 101A is displayed by the non-split screen application 106 on the user communication device 101B in an area that belongs to the non-split screen application 106. The non-split screen application 106 re-arranges its layout to put all its contents into the window 320-1 of the display 103B leaving the other window 320-2 to another non-split screen application 106 (or the same non-split screen application 106).

Figure 4:
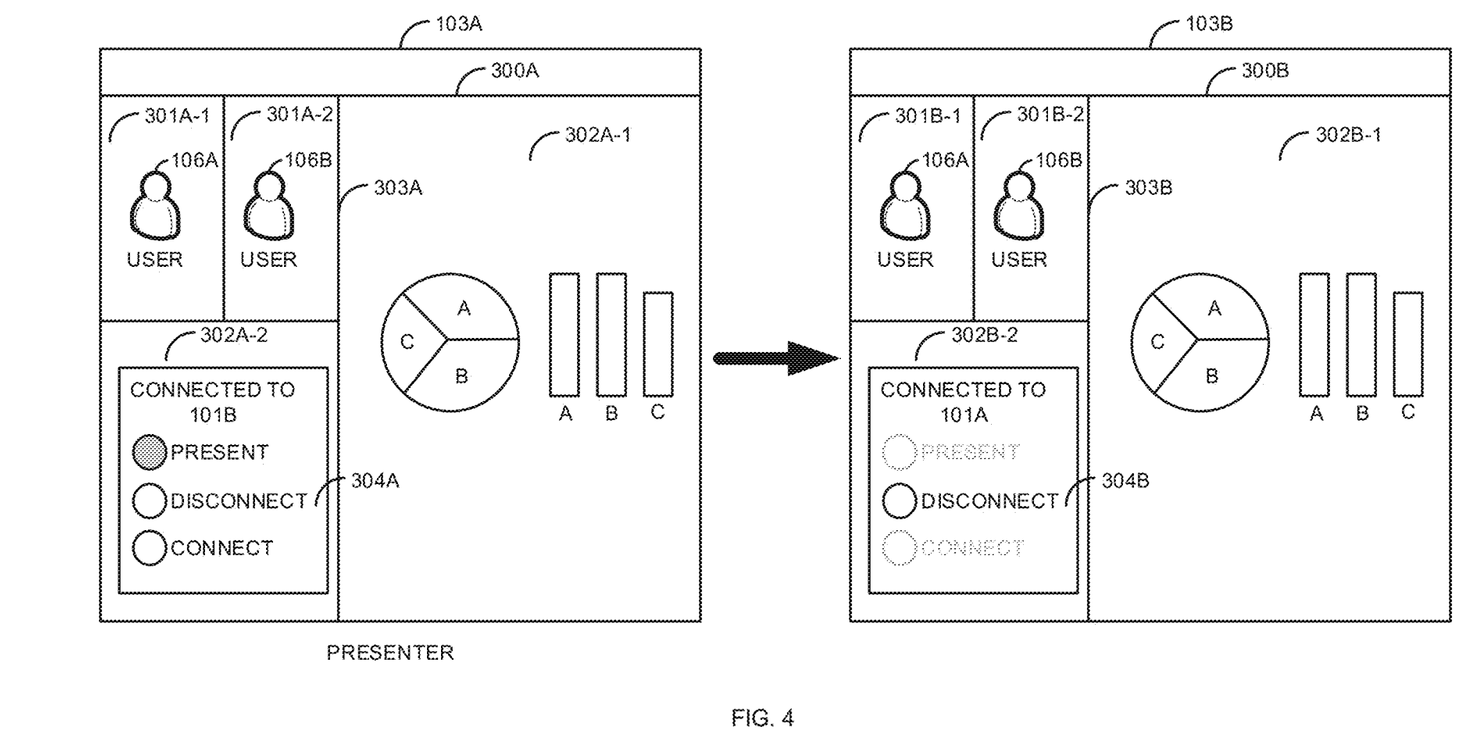
FIG. 4 is a diagram of how a split screen is propagated in video conference where a presenter controls how the split screen is propagated.

FIG. 4 is a diagram of how a split screen 300 is propagated in video conference where a presenter (user 106A) controls how the split screen 300 is propagated. FIG. 4 may work for a peer-to-peer video conference as described in FIG. 1 or in a bridged video conference as described in FIG. 2. FIG. 4 may work as described in FIG. 1 in a peer-to-peer video conference where there are more than two user communication devices 101 in a peer-to-peer video conference.

In FIG. 4, the split screens 300A and 300B are similar to FIG. 3A. However, in FIG. 4, the user 106B (a non-presenter) does not control the split bar 303B. In other words, the split bars 303A/303B are coupled. In FIG. 4, when the user 106A (the presenter) moves the split bar 303A to proportion the portions 302A-1 and 302A-2, the split bar 303B moves in a similar manner so that the portions 302B-1 and 302B-2 are proportioned similar to the portions 302A-1 and 302A-2. This way, as the user 106A can control how much of the image/video stream is displayed in the portions 302A-1/302B-1. For example, the user 106A may slide the split bar 303A to the left so that the image/video stream of the application 105A in the portion 302A-1 is displayed in 90% of the split screen 300A. Likewise, the image/video stream of the application 105A in the portion 302B-1 is displayed in 90% of the split screen 300B.

The above process will work in a similar manner if one split screen 300 uses a vertical split bar 303 and another split screen 300 uses a horizontal split bar 303. For example, the split screen 300A may use a horizontal split bar 300A and the split screen 300B may use a vertical split bar 303B. In this example, the proportions 302 of the two split screens 300A/300B would have similar proportions.

Figure 5:
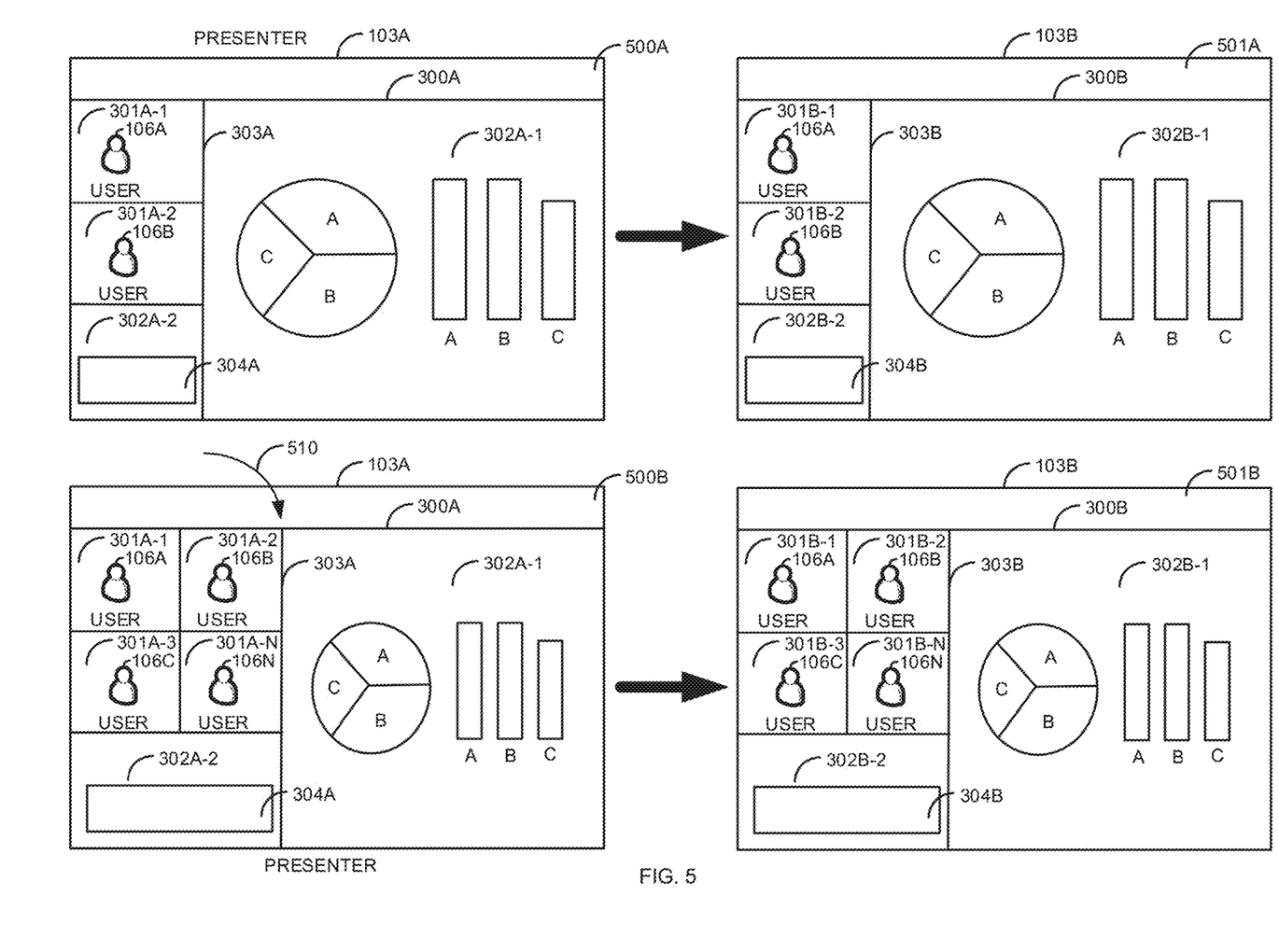
FIG. 5 is a diagram of how changing proportions of a split screen affect how a video conference is presented.

FIG. 5 is a diagram of how changing proportions of a split screen 300 affect how a video conference is presented. FIG. 5 may work for a peer-to-peer video conference as described in FIG. 1 or in a bridged video conference as described in FIG. 2. FIG. 5 may work as described in FIG. 1 in a peer-to-peer video conference where there are more than two user communication devices 101 in a peer-to-peer video conference.

The process of FIG. 5 is described using the process in FIG. 4 where only the user 106A (a presenter) controls the split bars 303A/303B. However, the process of FIG. 5 may also work for the process of FIG. 3A where each split bar (303A/303B) can be controlled independently of each other.

FIG. 5 is an exemplary example of a video conference that has at least four users 106A-106N at four user communication devices 101A-101N. FIG. 5 consists of different views (500A/500B) of the split screen 300A and corresponding views (501A/501B) of the split screen 300B. The views 500A/501A are similar to the split screens 300A-300B that are shown in FIG. 4 with the exception that the portions 302A-1/302A-2 and 302B-1/302B-2 are proportioned differently. As a result, the windows 301A-1/301A-2 and 301B-1/301B-2 are arranged in a different organization. In addition, windows (301A-3 and 301A-N) for the users 106C and 106N are not shown in views 500A/501A because of limited space in the portions 302A-2/302B-2.

As shown in step 510, the user 106A moves the split bar 303A (to the right) to a new position as shown in view 500B. This results in the portion 302A-2 now displaying window 301A-3 (for user 106C) and window 301A-N for user 106N (a new organization). Since the view 500B has changed, the corresponding view 501B also changes by adding the window 301B-3 for user 106C and window 301B-N for user 106N (also a new organization).

The new organization of the portions 302A-2/302B-2 may change in various ways, such as, by removing one or more windows 301 (user video streams), adding one or more new windows 301 (user video streams), replacing one or more of the windows 301 (user video streams) with avatars, changing a location of one or more of windows 301, changing a size of one or more of the windows 301, and/or the like. Changing the organization of the windows 301 may be based on an order when the users 106A-106N last spoke, a title of the one or more of the users 106A-106N, a number other users 106 at a location (i.e., using an individual user communication device 101, and/or the like.

The process of FIG. 5 may work for where the split pars 303A/303B are either coupled or independent of each other. For example, the process of FIG. 5 may work with the embodiments described in FIG. 3A and FIG. 4.

In FIGS. 3-5, the communication device 101B may not have a split screen application 102. In this example, the user communication device 101B may display the image/video stream presentation of the application 105A in a layout of its preferred onto a rectangular area assigned to remote presentation.

As described above in FIGS. 3-5, only a single image/video stream of an application 105A is described in the split screens 300A/300B. However, in one embodiment, one or more additional application(s) 105A may be added to the split screens 300A/300B (i.e., causing one or more new portion(s) 302A/302B to be displayed in the split screens 300A/300B). In this example, there may be two or more split bars 303 in the split screens 300A/300B. Alternatively, the additional image/video stream of the application 105A may be displayed using a set of tabs in the portions 302A-1/302B-1.

In one embodiment, for FIGS. 3-5, the portions 302A-2/302B-2 may be overlaid over the portions 302A-1/302B-1. In this embodiment, the implementation is not a standard split screen application 102 as discussed above. The overlaid portions 302A-1/302A-2 and 302B-1/302B-2 are areas of inside the domain of the same application. For example, the portion 302A-2 may be overlaid on top of the portion 302A-1 to only cover the upper left hand corner of the split screen 300A. In this example, the portion 302A-1 would actually be displayed in the whole split screen 300A while the portion 302A-2 is overlaid in the top left hand corner of the split screen 300A.

Figure 6:
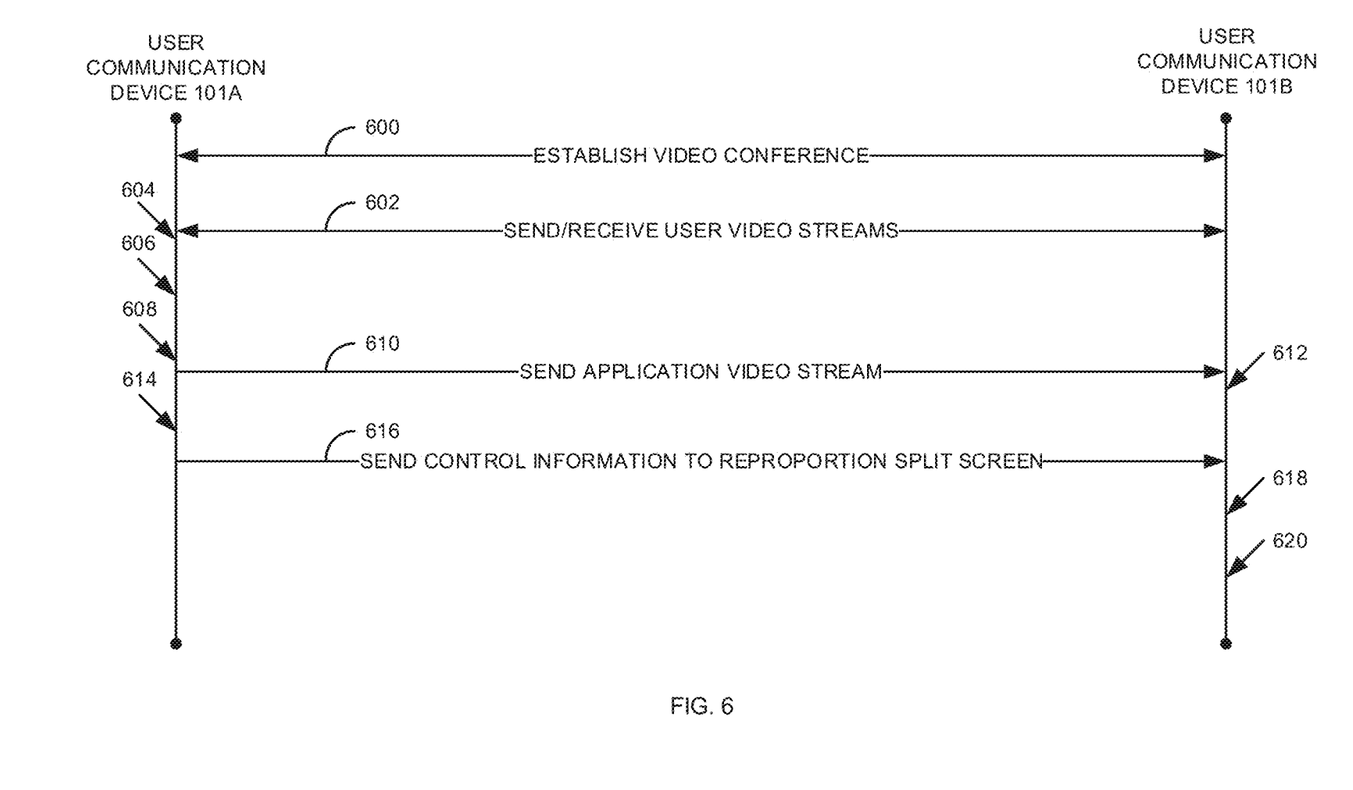
FIG. 6 is a flow diagram of a process using a split screen in a peer-to-peer video conference.

FIG. 6 is a flow diagram of a process using a split screen 300 in a peer-to-peer video conference. The process of FIG. 6 is described based on FIG. 1. The process starts in step 600 when the user communication devices 101A-101B establish a video conference. For example, but not limited to, the user communication devices 101A-101B may establish a video communication session using Session Initiation Protocol (SIP) or H.323 in step 600 as is known in the art. The user communication devices 101A-101B then send/receive their respective user video streams in step 602 using Real Time Protocol (RTP) to send streams of media contents along with corresponding and Real Time Control Protocol (RTCP) streams also known in the art. For example, the user communication device 101A sends a video stream of the user 106A (captured by the camera 104A) to the user communication device 101B (e.g., as shown in window 301B-1). Likewise, the user communication device 101B sends a video stream of the user 106B (captured by the camera 104B) to the user communication device 101A (e.g., as shown in window 301A-2).

The user 106A provides, in step 604, an indication to go into presentation mode (e.g., selecting the present button as described in step 312 of FIG. 3A). Although not shown, a message may be sent from the user communication device 101A to the user communication device 101B (along with any other user communication devices 101 in the video conference) that indicates that the user 106A is entering presentation mode. This results in the present button of the management menu 304B to become greyed out because only one user 106 may present at a time.

The user 106A then selects, in step 606, an image/video stream of the application 105A (e.g., by activating the functionality to grab-and-share an image/video steam from the application 105A as shown in step 314 of FIG. 3A). If an image is selected, the split screen application 102A converts the image into a video stream in step 608. The video steam of the image/video stream of the application 105A is then sent, in step 610, by the split stream application 102A to the user communication device 101B. The split screen application 102B displays, in step 612, the image/video stream in the portion 302B-1 of the split screen 300B.

If the split screen applications 102A/102B only allow a presenter (user 106A) to control the split bars 303A/303B as described in FIG. 4, when the user 106A moves the split bar 303A, in step 614, the split screen application 102A sends, in step 616 control information to re-proportion the split screen 300B. The split screen application 102B modifies, in step 618, the split screen 300B according to the control information and then displays the split screen 300B in step 620 (e.g., as described in FIG. 4). For example, the control information may indicate the position of the split bar 303A, the position/size of the windows 301A-1-301A-N, an avatar to replace the video stream of the users 106A-106N, and/or the like. The process of steps 616-620 may be optional.

Figure 7:
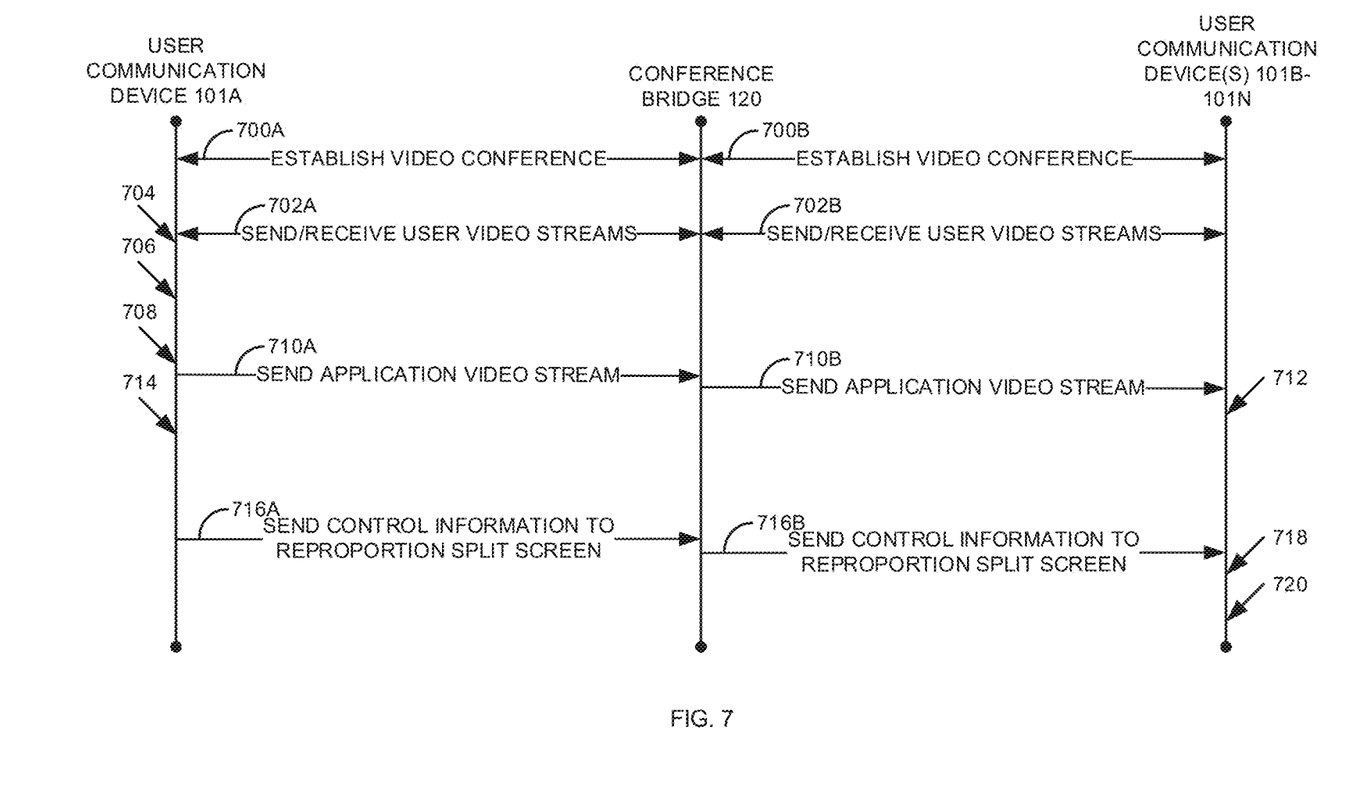
FIG. 7 is a flow diagram of a process using a split screen in a bridged video conference.

FIG. 7 is a flow diagram of a process using a split screen 300 in a bridged video conference. The process starts in step 700A when the user communication device 101A establishes a video conference with the conference bridge 120. The user communication devices 101B-101N also establish a video conference with the conference bridge in step 700B. The user communication devices 101A-101N then send/receive their respective video streams via the conference bridge 120 in steps 702A/702B. For example, the user communication device 101A sends a video stream of the user 106A (captured by the camera 104A) to the user communication devices 101B/101N via the conference bridge 120. The user communication device 101B sends a video stream of the user 106B (captured by the camera 104B) to the user communication devices 101A/101N via the conference bridge 120. Likewise, the user communication device 101N sends a video stream of the user 106N (captured by the camera 104N) to the user communication devices 101A-101B via the conference bridge 120.

The user 106A provides, in step 704, an indication to go into presentation mode (e.g., selecting present button as shown in step 312 of FIG. 3A). Although not shown, a message may be sent from the user communication device 101A to the user communication devices 101B-101N, via the conference manager 122, which indicates that the user 106A is entering presentation mode. This results in the present button of the management menus 304 of the user communication devices 101B-101N to become greyed out because only one user 106 may present at a time. In one embodiment, the conference manager 122 may control which users 106A-106N can enter the present mode. For example, based on a user code entered when joining the video conference, only a single user 106 may be allowed to present.

The user 106A then selects, in step 706, an image/video stream of the application 105A (e.g., by dragging-and-dropping an image/video steam from the application 105A as shown in step 314 of FIG. 3A). If an image is selected, the split screen application 102A converts the image into a video stream in step 708. The video steam of the image/video stream of the application 105A is then sent by the split stream application 102A, in steps 710A/710B, to the user communication devices 101B-101N via the conference bridge 120. The split screen applications 102B-102N then displays, in step 712, the image/video stream in the respective portions 302 of the split screens 300 in the user communication devices 101B-101N.

If the split screen applications 102A-102N only allow a presenter (user 106A) to control the split bars 303 as described in FIG. 4, when the user 106A moves the split bar 303A, in step 714, the split screen application 102A sends, in step 716A control information, which is forwarded by the conference manager 122, to re-proportion the split screens 300 of the user communication devices 101B-101N. The split screen applications 102B-101N modify, in step 718, the split screens 300 according to the control information and then displays the split screens 300 in step 720. For example, the control information may indicate the position of the split bar 303A, the position/size of the windows 301A-1-301A-N, an avatar to replace the video stream of the users 106A-106N, and/or the like. The process of steps 716A, 716B, 718, and 720 may be optional based on implementation.

Figure 8:
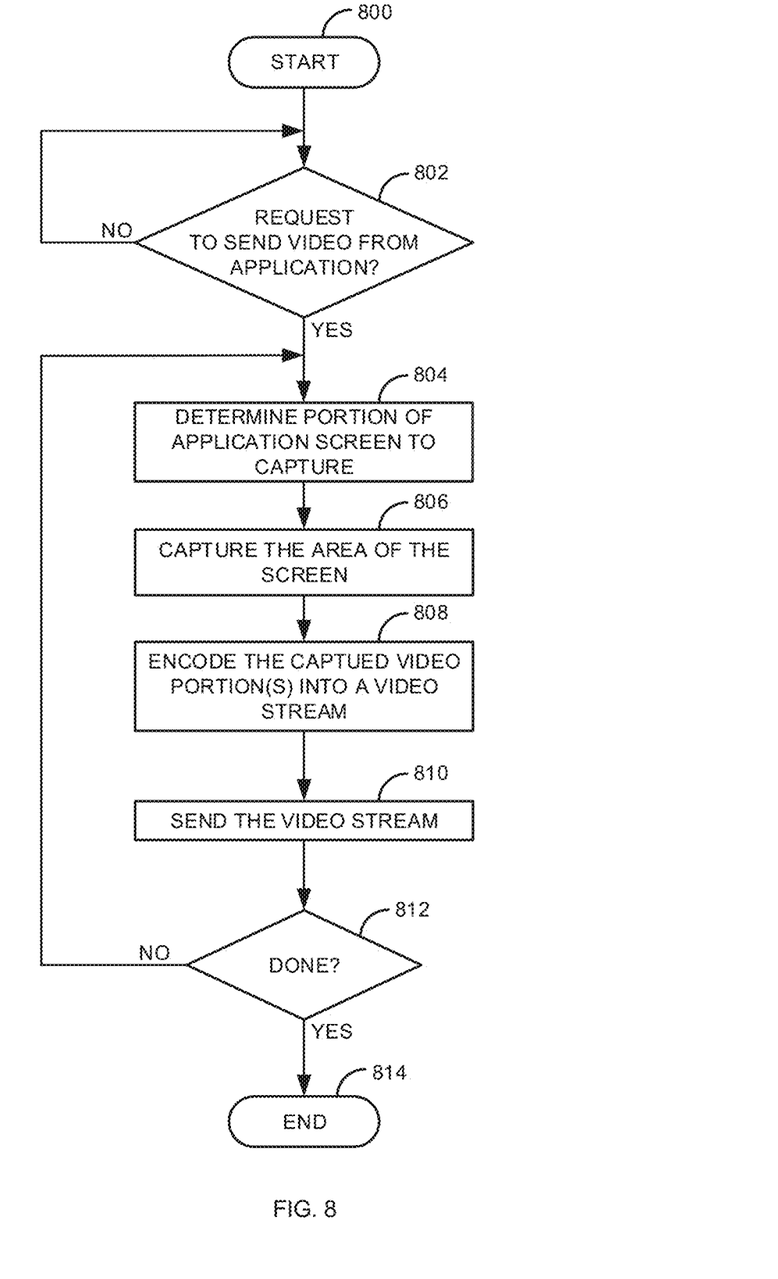
FIG. 8 is a flow diagram of a process for getting video from an application to present in a video conference.

FIG. 8 is a flow diagram of a process for getting video from an application 105A to present in a video conference. The process starts in step 800. The split screen application 105A determines if a request to send video from an application 105A is received in step 802. For example, if the user 106A has dragged-and-dropped an image/video stream from the application 105A as shown in step 314 of FIG. 3A. If a request is not received in step 802, the process goes back to step 802.

Otherwise, if a request to send an image/video stream from the application 105A is received in step 802, the split screen application 102A determines the portion of the application screen to capture in step 804. The portion of the application screen may be only an area that is showing, a portion of the area showing, a portion of a showing area and a non-showing area (e.g., that is covered by another window), and/or the like. The portion may be selected based on one or more defined rules and/or user preferences. For example, the user may be able to select a portion of the screen to send before grabbing-and-sharing in step 314. The area of the screen of the application 105A is then captured, in step 806, by the split screen application 102A. The captured area of the screen is then encoded, by the split screen application 102A, into a video stream in step 808. The video stream is then sent, by the split screen application 102A, to the other user communication device(s) 101 in the video conference in step 810.

The split screen application 102A determines, in step 812, if the user 106A is done presenting. For example, the user 106A may end the video conference. If the user 106A is done presenting in step 814, the process ends in step 814. Otherwise, the process goes back to step 804.

Examples of the processors as described herein may include, but are not limited to, at least one of Qualcomm® Snapdragon® 800, 810, 820, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Rockchip RK3399 processor, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
receiving, at a second user communication device, a first video stream, wherein the first video stream is generated by a first application on a first user communication device;
receiving, at the second user communication device, a second video stream, wherein the second video stream is of a first user of the first user communication device;
receiving, at the second user communication device, a third video stream, wherein the third video stream is generated by a second application on the first user communication device;
displaying the first video stream in a first portion of a first split screen;
displaying the second video stream in a second portion of the first split screen, wherein the first split screen is displayed on the second user communication device; and
displaying the third video stream in a third portion of the first split screen, wherein the first portion, second portion, and third portion of the first split screen are controllable to be proportioned by the second user of the second communication device using two separate split bars.

2. The method of claim 1, wherein displaying the second video stream in the second portion of the first split screen is accomplished by overlaying the second video stream on top of the first video stream.

3. The method of claim 1, wherein the first user communication device displays a second split screen, wherein the first video stream is displayed in a first portion of the second split screen, wherein a fourth video stream of the second user of the second user communication device is displayed in a second portion of the second split screen, wherein the first user of the first user communication device is enabled to change a first proportion of the second split screen, and wherein the second user of the second user communication device is enabled to change a second proportion of the first split screen independently from the first proportion of the second split screen.

4. The method of claim 1, further comprising:
receiving control information, wherein the control information identifies how the first split screen is to be proportioned by the second user communication device; and
in response to receiving the control information, proportioning the displayed first split screen according to the received control information.

5. The method of claim 1, further comprising a conference bridge, wherein the first user communication device and the second user communication device are in a video conference with at least a third user communication device via the conference bridge, and wherein the conference bridge manages which one of the user communication devices sends the first video stream in the video conference.

6. The method of claim 5, further comprising:
receiving a fourth video stream, wherein the fourth video stream is of a third user of the third user communication device, wherein the fourth video stream is also displayed in the second portion of the first split screen;
receiving control information, wherein the control information identifies how the first split screen is to be proportioned by the second user communication device; and
in response to receiving the control information, changing an organization of the second portion.

7. The method of claim 6, wherein the control information is forwarded by the conference bridge to both the second user communication device and the third user communication device.

8. The method of claim 6, wherein changing the organization of the second portion comprises least one of: removing one or more of the second and fourth video streams in the second portion of the first split screen, adding one or more new video streams of one or more additional users in the video conference for display in the second portion of the first split screen, replacing one or more of the second and fourth video streams with avatars for display in the second portion of the first split screen, changing a location of one or more of the second and fourth video streams for display in the second portion of the first split screen, and changing a size of one or more of the second and fourth video streams for display in the second portion of the first split screen.

9. The method of claim 6, wherein changing the organization of the plurality of video streams is based on at least one of: when one of the second and third users last spoke, a title of the second and third users, and a number of other users at a location.

10. The method of claim 1, wherein the first video stream is encoded from a user selected portion of a video image.

11. A second user communication device comprising:
a microprocessor; and
a computer readable medium, coupled with the microprocessor and comprising microprocessor readable and executable instructions that, when executed by the microprocessor, cause the microprocessor to:
receive a first video stream, wherein the first video stream is generated by a first application on a first user communication device;
receive a second video stream, wherein the second video stream is of a first user of the first user communication device;
receive a third video stream, wherein the third video stream is generated by a second application on the first user communication device;
display the first video stream in a first portion of a first split screen;
display the second video stream in a second portion of the first split screen; and
display the third video stream in a third portion of the first split screen, wherein the first portion, the second portion, and the third portion of the first split screen are controllable to be proportioned by the second user of the second communication device using two separate split bars.

12. The second user communication device of claim 11, wherein the first user communication device displays a second split screen, wherein the first video stream is displayed in a first portion of the second split screen, wherein a fourth video stream of the second user of the second user communication device is displayed in a second portion of the second split screen, wherein the first user of the first user communication device is enabled to change a first proportion of the second split screen, and wherein the second user of the second user communication device is enabled to change a second proportion of the first split screen independently from the first proportion of the second split screen.

13. The second user communication device of claim 11, wherein the microprocessor readable and executable instructions cause the microprocessor to:
receive control information, wherein the control information identifies how the first split screen is to be proportioned by the second user communication device; and
in response to receiving the control information, proportion the displayed first split screen according to the received control information.

14. The second user communication device of claim 11, further comprising a conference bridge, wherein the first user communication device and the second user communication device are in a video conference with at least a third user communication device via the conference bridge, and wherein the conference bridge manages which one of the user communication devices sends the first video stream in the video conference.

15. The second user communication device of claim 14, wherein the microprocessor readable and executable instructions cause the microprocessor to:
receive a fourth video stream, wherein the fourth video stream is of a third user of the third user communication device, wherein the fourth video stream is also displayed in the second portion of the first split screen;
receive control information, wherein the control information identifies how the first split screen is to be proportioned by the second user communication device; and
in response to receiving the control information, change an organization of the second portion.

16. The second user communication device of claim 14, wherein the control information is forwarded by the conference bridge to both the second user communication device and the third user communication device.

17. The second user communication device of claim 14, wherein changing the organization of the second portion comprises least one of: removing one or more of the second and fourth video streams in the second portion of the first split screen, adding one or more new video streams of one or more additional users in the video conference for display in the second portion of the first split screen, replacing one or more of the second and fourth video streams with avatars for display in the second portion of the first split screen, changing a location of one or more of the second and fourth video streams for display in the second portion of the first split screen, and changing a size of one or more of the second and fourth video streams for display in the second portion of the first split screen.

18. A method comprising:
capturing, by a first application, an image or a first video stream generated by a first application;
sending, from a first user communication device, the first video stream or a video stream generated from the captured image;
sending, from the first user communication device, a second video stream that is generated by a second application, wherein the second video stream is of a first user of the first user communication device, wherein the first video stream and the second video stream are encoded to be displayed on a first split screen of a second user communication device;

receiving, from the second user communication device, a third video stream; and displaying, on the first user communication device, a second split screen, wherein the second split screen has a first portion, a second portion, and a third portion, and wherein the first portion, the second portion, and the third portion of the second split screen are controllable to be proportioned using two separate split bars.

19. The method of claim 18, wherein the first video stream is encoded to be displayed on a first portion of the first split screen and wherein the second video stream is encoded to be displayed on a second portion of the first split screen.

20. The methods of claim 18, wherein the first user of the first user communication device is enabled to change a first proportion of the second split screen independently from the second user communication device.

\* \* \* \* \*